United States Patent
Gorski et al.

(10) Patent No.: US 9,644,740 B2
(45) Date of Patent: May 9, 2017

(54) PASS-THROUGH SEAL AND SYSTEM HAVING PASS-THROUGH SEAL FOR SEALING VEHICULAR COMPONENT

(71) Applicant: DENSO International America, Inc., Southfield, MI (US)

(72) Inventors: Scott Gorski, Dearborn Heights, MI (US); Mark Rothenberg, Farmington Hills, MI (US); Jason Hendry, Milford, MI (US)

(73) Assignee: Denso International America, Inc., Southfield, MI (US)

( * ) Notice: Subject to any disclaimer, the term of this patent is extended or adjusted under 35 U.S.C. 154(b) by 0 days.

(21) Appl. No.: 14/753,603

(22) Filed: Jun. 29, 2015

(65) Prior Publication Data

US 2016/0377177 A1    Dec. 29, 2016

(51) Int. Cl.
| | |
|---|---|
| *F16J 15/02* | (2006.01) |
| *F16J 15/06* | (2006.01) |
| *B62D 25/24* | (2006.01) |
| *B60H 1/00* | (2006.01) |

(52) U.S. Cl.
CPC ........ *F16J 15/022* (2013.01); *B60H 1/00571* (2013.01); *B62D 25/24* (2013.01); *F16J 15/065* (2013.01)

(58) Field of Classification Search
CPC ........ F16J 15/022; F16J 15/065; B62D 25/24; B60H 1/00571
USPC .......................................................... 296/208
See application file for complete search history.

(56) References Cited

U.S. PATENT DOCUMENTS

| | | | |
|---|---|---|---|
| 6,981,737 B2* | 1/2006 | Welsh ................ | B60H 1/00571 296/187.02 |
| 2014/0042713 A1* | 2/2014 | Grieb .................. | B60R 13/0846 277/606 |

* cited by examiner

*Primary Examiner* — Joseph D Pape
*Assistant Examiner* — Dana Ivey
(74) *Attorney, Agent, or Firm* — Harness, Dickey & Pierce, P.L.C.

(57) ABSTRACT

A pass-through seal may seal a component extending between a first member and a second member in a vehicle. The pass-through seal may define a core opening and have a varying outer profile. The core opening receives the component at a predefined angle relative to an aperture defined by the first member. The core opening supports the component at the predefined angle at one end and has a snug fit with the component at the other end. The varying outer profile is configured to create an interference fit with the aperture defined by the first member at one end and to be larger than the aperture at the other end.

16 Claims, 4 Drawing Sheets

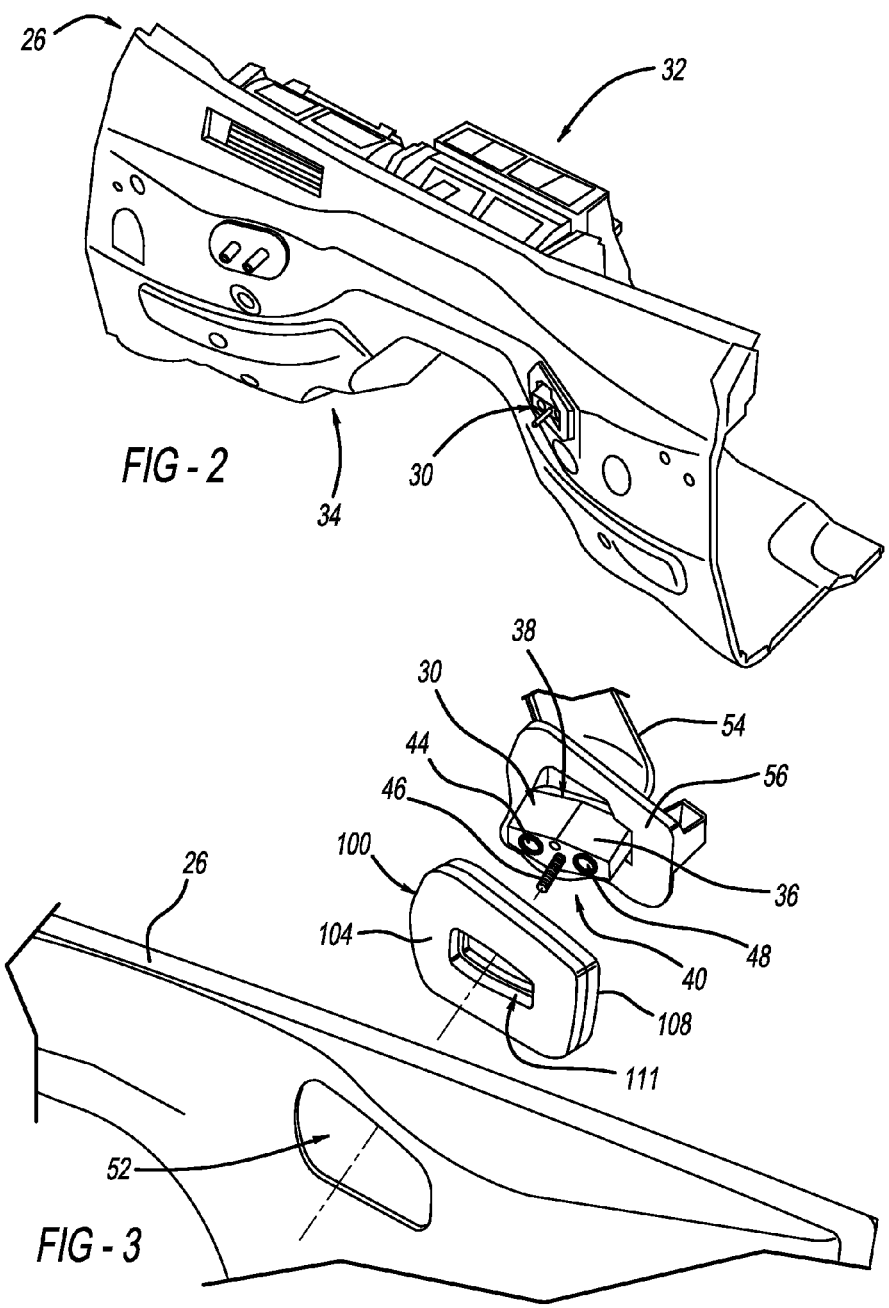

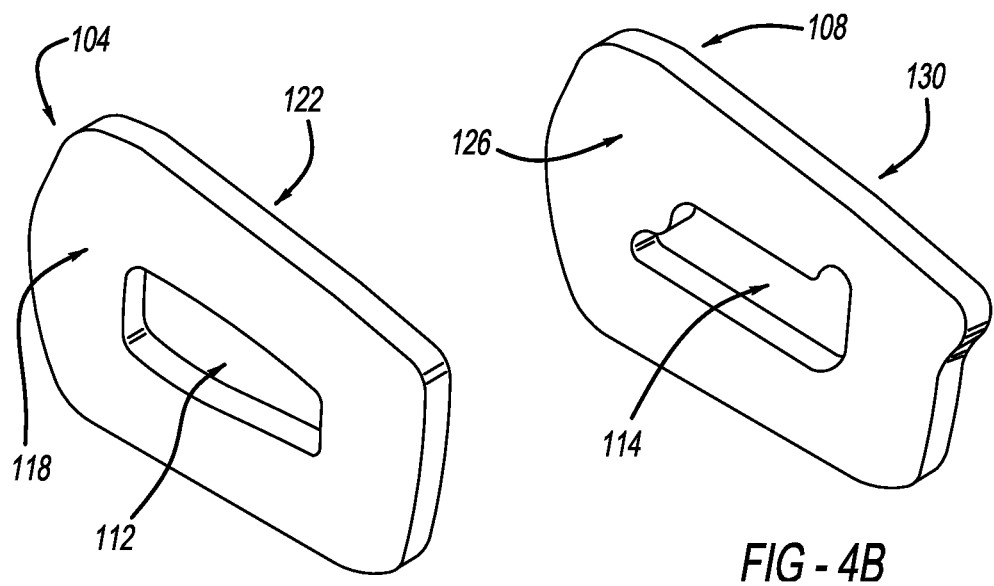
FIG - 4A
FIG - 4B
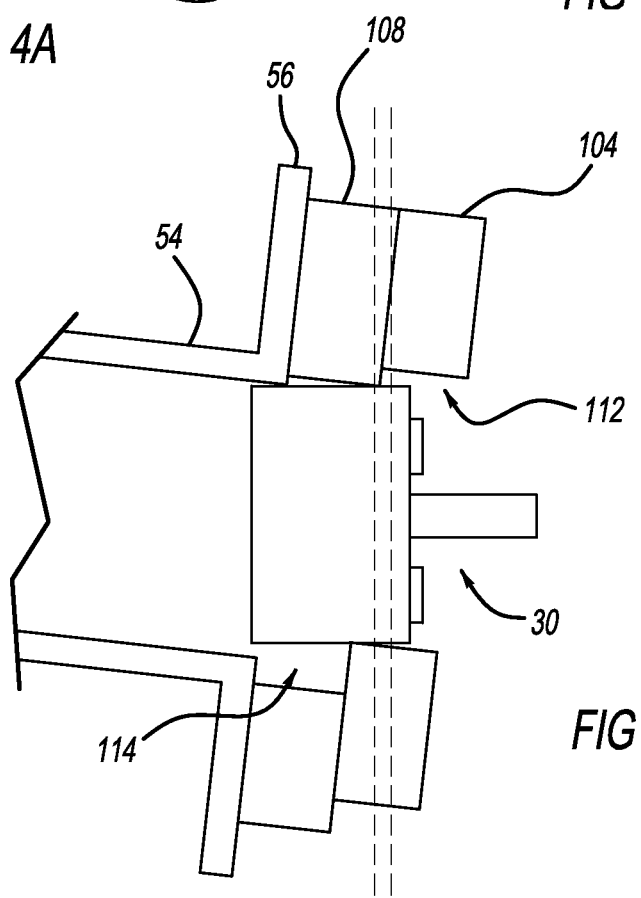
FIG - 5

PASS-THROUGH SEAL AND SYSTEM HAVING PASS-THROUGH SEAL FOR SEALING VEHICULAR COMPONENT

FIELD

The present disclosure relates to a seal for sealing a component passing through a member of a vehicle.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Components in a vehicle can be arranged to extend through an opening defined by a structural member of the vehicle. As an example a thermal expansion valve (TXV) may extend through an opening defined by a firewall of the vehicle. In another example, fluid lines extending from an engine bay of the vehicle may extend along the undercarriage of the vehicle and then into a floorboard of the vehicle to a rear HVAC system.

A component and the structural member receiving the component can be configured such that the component is received orthogonally to a surface of the structural member. In such configurations, a seal can be used to seal an area between the component and the opening defined by the structural component. For example, a die-cut style seal having a single cut axis may be used to create an interference fit with the opening.

As an example, a TXV is commonly used to control the flow of refrigerant through an evaporator of a vehicle air conditioning system. The TXV meters flow of refrigerant to the evaporator based on the temperature of the refrigerant that has passed through the evaporator, as sensed by a sensor bulb. On an evaporator side of a TXV housing, which houses the TXV, an evaporator "in" line and an evaporator "out" line extend from the TXV housing. Engine bay piping provides a conduit for the TXV on the engine bay side of a firewall. The TXV extends from the conduit in order to pass through an opening in the firewall.

Typically, a TXV pass-through seal includes a die-cut foam seal having an outer profile that is orthogonal relative to the instrument panel opening. The die-cut seal is either adhered to the TXV conduit or designed as an interference fit to support the TXV. This approach works best when the TXV is loaded orthogonally relative to the firewall aperture. In scenarios where the TXV is loaded non-orthogonally relative to a sealing surface on the firewall, a seal having an inner profile that is non-orthogonal relative to the firewall aperture may result in sealing gaps, increased noise, and/or stress to the TXV.

Accordingly, a single cut axis seal may create the necessary interference only when the surface of the structural member is orthogonal to an assembly direction of the component. Therefore, a pass-through seal and/or system for sealing a component to surfaces that are non-orthogonal relative to the loading angle of the component is desirable

SUMMARY

This section provides a general summary of the disclosure, and is not a comprehensive disclosure of its full scope or all of its features. The present disclosure provides for a pass-through seal for sealing a component extending between a first member and a second member in a vehicle. The pass-through seal defines a core opening and has a varying outer profile. The core opening receives the component at a predefined angle relative to an aperture defined by the first member. The core opening supports the component at the predefined angle at one end and has a snug fit with the component at the other end. The varying outer profile is configured to create an interference fit with the aperture defined by the first member at one end and to be larger than the aperture at the other end.

In a feature of the present disclosure, the pass-through seal includes two or more portions that are fixedly coupled. The two of or more portions includes: a first portion and a second portion. The first portion has an outer profile configured to create the interference fit with the aperture defined by the first member. The first portion defines a first opening that forms part of the core opening and supports the component at the predefined angle. The second portion has an outer profile larger than the aperture of the first member to prevent the second portion from passing through the aperture. The second portion defines a second opening that forms part of the core opening and fits snuggly around the component.

Further areas of applicability of the present disclosure will become apparent from the detailed description, the claims, and the drawings. The detailed description and specific examples are intended for purposes of illustration only, and are not intended to limit the scope of the disclosure.

BRIEF DESCRIPTION OF THE DRAWINGS

The present disclosure will become more fully understood from the detailed description and the accompanying drawings, wherein:

FIG. 2 is a perspective view of a firewall associated with the vehicle illustrated in FIG. 1;

FIG. 3 is a perspective view of a portion of the firewall illustrated in FIG. 2 including a TXV assembly and a pass-through seal according to the principles of the present disclosure;

FIG. 4*a* is a perspective view of a first portion of the pass-through seal illustrated in FIG. 3;

FIG. 4*b* is a perspective view of a second portion of the pass-through seal illustrated in FIG. 3;

FIG. 5 is a cut away of a pass-through seal and a TXV assembly according to the principles of the present disclosure;

In the drawings, reference numbers may be reused to identify similar and/or identical elements.

DETAILED DESCRIPTION

A component in a vehicle may pass through an opening defined by a structural member of the vehicle. The component may be assembled at a predetermined angle with respect to a surface of the structural member, where the predetermined angle may be orthogonal or non-orthogonal to the surface. A pass-through seal of the present disclosure supports the component and seals an area between the component and the opening.

More particularly, the pass-through seal, as described in detail below, defines a core opening in which the component is supported. The pass-through seal includes multiple portions, where each of the portions defines an opening that forms the core opening when the portions are fixedly coupled to each other. The portions may be configured to have different openings and different outer profiles such that the portions interface with the component at different points along the component. As an example, one of the multiple portions, which may be referred to as a first portion, may have an interference fit with the opening of the structural member. Another portion, which may be referred to as a second portion, may support the component by being snugly fit around the component. Accordingly, even if the angle at which the component is assembled with the respect to the opening is non-orthogonal, the multiple portions of the pass-through seal can be configured to align and guide the component through the opening and seal the opening.

Figure 1:
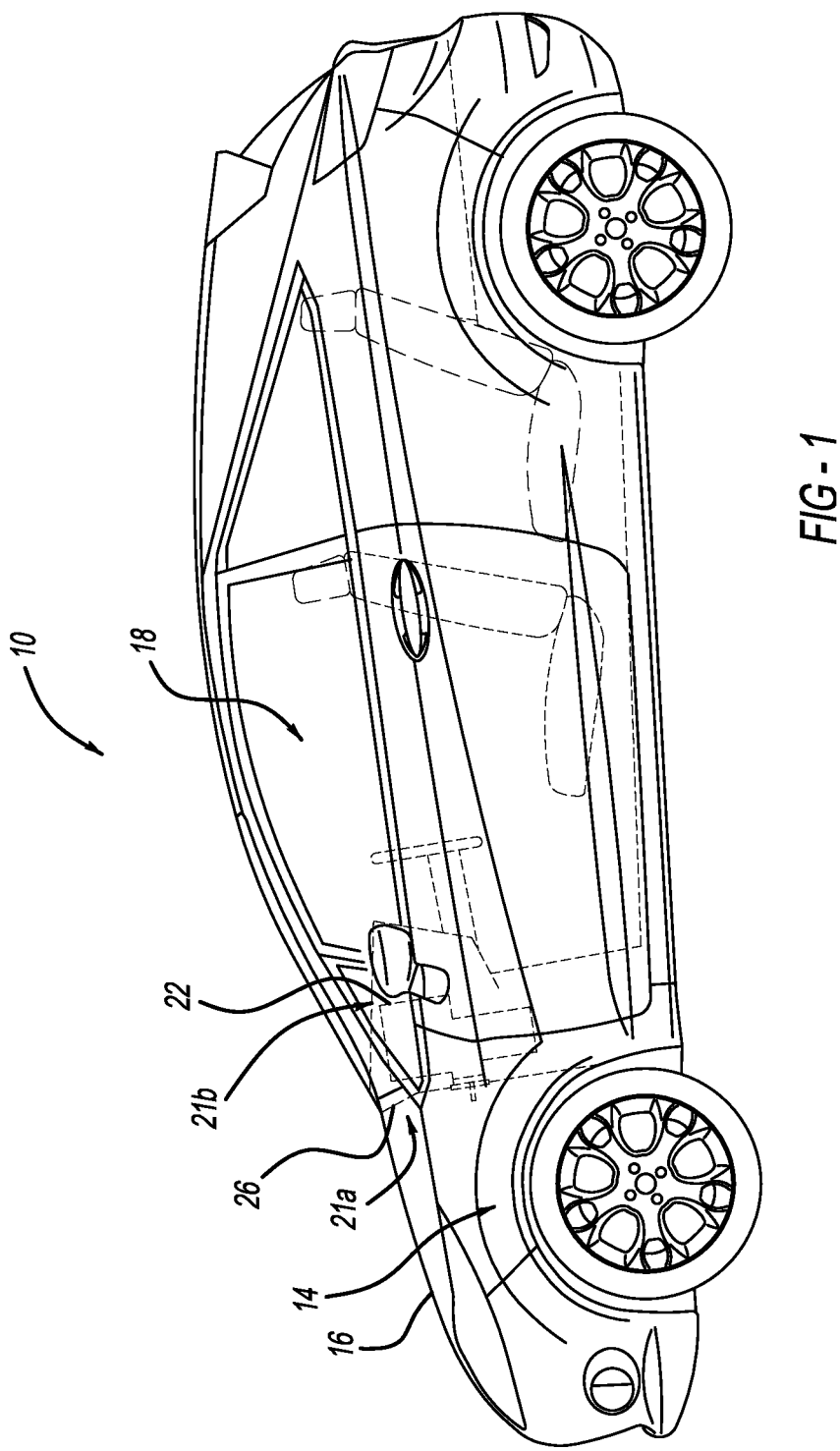
FIG. 1 is a side view of a vehicle according to a first example embodiment of the present disclosure.

The present disclosure will now be described more fully with reference to the accompany drawings. With initial reference to FIG. 1, a vehicle 10 according to the teachings of the present disclosure is illustrated. The vehicle 10 includes an engine bay 14, a passenger compartment 18, and an instrument panel 22. The engine bay 14 is disposed under a hood 16, and houses, in some examples, an internal combustion engine (not shown). Alternatively, the engine bay 14 may house a hybrid engine or components of an electric motor. The engine bay 14 is further disposed on a first side 21*a* of a firewall 26.

The firewall 26 separates the engine bay 14 from the passenger compartment 18, which is located on a second side 21*b* of the firewall 26. The firewall 26 may prevent a fire in the engine bay 14 from spreading to the passenger compartment 18. The instrument panel 22 is disposed inside the passenger compartment 18 on the second side 21*b* of the firewall 26.

Various vehicle components are loaded into the instrument panel 22 prior to the instrument panel 22 being installed in the vehicle 10. For example, during vehicle assembly, the instrument panel 22 may be pre-loaded with dials, such as a speedometer and odometer; sensors; and various components of a heating, ventilation, and air conditioning (HVAC) system. While limited examples are provided, it is understood that the instrument panel 22 may be pre-loaded with any suitable vehicle component.

The HVAC system includes a thermal expansion valve (TXV) assembly 30, as illustrated in FIGS. 2 and 3. The TXV assembly 30 includes a TXV housing 36 that encloses a TXV. The TXV assembly 30 meters flow of refrigerant to an evaporator of the HVAC system. The TXV housing 36 includes a first side or evaporator side 38 and a second side or compressor/condenser side 40. The first side 38 is opposite to the second side 40.

The TXV housing 36 is connected to the evaporator at the first side 38. Specifically, a first output line (or evaporator "in" line) (not shown) is coupled at the first side 38 to direct refrigerant away from the TXV housing 36 and into the evaporator. A first input line (or evaporator "out" line) (not shown) directs refrigerant away from the evaporator and to the TXV housing 36, and is coupled to the TXV housing 36 at the first side 38.

The TXV housing 36 includes a second output 44 and a second input 48. The second output 44 is configured to receive a second output line (not shown). Similarly, the second input 48 is configured to receive a second input line (not shown). The second output 44 and the second input 48 are disposed on the second side 40 of the TXV housing 36. The second output line is received at the second output 44 in order to direct refrigerant to a compressor of the HVAC system. The second input line is received at the second input 48 in order to direct refrigerant from a condenser to the TXV housing 36 and the TXV assembly 30. The TXV housing 36 also includes a block fastener 46. The block fastener 46 is disposed on the second side 40 between the second output 44 and the second input 48. The block fastener 46 is configured to fasten a block (not shown) to the TXV housing 36. The block may include the second output line and the second input line.

The firewall 26 includes a passenger compartment side 32 and an engine bay side 34. The engine bay side 34 faces the engine bay 14. Conversely, the passenger compartment side 32 faces the passenger compartment 18. The firewall 26 includes a plurality of pass-through openings (i.e. apertures) that allow components to pass through the firewall 26 from the engine bay side 34 to the passenger compartment side 32. For example, the plurality of pass-through apertures includes an aperture 52, as illustrated in FIG. 3. The aperture 52 is configured to receive a component of the HVAC system, such as the TXV assembly 30. The TXV assembly 30 is loaded into the firewall 26 such that the TXV assembly 30 passes through the firewall 26 from the engine bay side 34 to the passenger compartment side 32.

The HVAC system includes a conduit 54 that partially covers the TXV assembly 30. For example, the conduit 54 may cover the first output line, the first input line, and a portion of the TXV housing 36. The conduit 54 may be made of plastic or other suitable material. As Illustrated in FIG. 3, the conduit 54 directs the TXV assembly 30 toward the aperture 52. The conduit 54 includes a flange 56 disposed at an end of the conduit 54. The flange 56 may have a profile that is larger than the aperture 52 such that the flange 56 prevents the conduit 54 from passing through the aperture 52.

A pass-through seal forms a seal between the conduit 54 and the firewall 26. The pass-through seal may be a rubber or plastic gasket that adheres to the conduit 54 and provides a seal between the conduit 54 and the firewall 26. In other examples, the pass-through seal may comprise a die-cut foam seal having an outer profile and an inner profile that are orthogonal relative to the aperture 52. The die-cut seal may be adhered to the conduit 54. In other examples, the die-cut seal may be designed as an interference fit to support the TXV assembly 30. In other words, the seal is wedged between a bottom portion of the TXV assembly 30 and a portion of the engine bay 14. The seal may be slid over a TXV, such as the TXV assembly 30, and loaded into the firewall 26. In the above examples, the TXV assembly 30 may be loaded at an angle that is orthogonal relative to the firewall 26.

According to the principles of the present disclosure, the TXV assembly 30 may be loaded non-orthogonally relative to the firewall 26. As illustrated in FIG. 3, a pass-through seal 100 defines a core opening 111 that is configured to support the TXV assembly 30. The pass-through seal is also configured to form a seal between the conduit 54 and the firewall 26 when the TXV assembly 30 is loaded non-orthogonally relative to the firewall 26. The seal 100 includes a first portion 104 and a second portion 108. The first portion 104 may be adhered to the second portion 108. In an example, the first portion 104 is glued to the second portion 108. In yet another example, the first portion 104 is adhered to the second portion 108 using double sided tape. It is understood that the first portion 104 may be adhered to the second portion 108 by any suitable means. Further, while the seal 100 is described as comprising first and second portions, the seal 100 may comprise 3, 4, 5, or any suitable number of portions.

The seal 100 is slid over the TXV housing 36 when the TXV assembly 30 is loaded into the firewall 26. As illustrated in FIGS. 4a and 4b, the first portion 104 includes a firewall facing side 118, a second portion facing side 122, and a first opening 112. The second portion 108 includes a first portion facing side 126, a flange facing side 130, and a second opening 114. The first opening 112 and the second opening 114 form the core opening 111.

The first opening 112 may be an oblong shaped opening, an oval shaped opening, or any suitably shaped opening. In some implementations, the first opening 112 has a shape similar to the aperture 52. The first opening 112 is configured to support the TXV assembly 30 at an angle relative to the firewall 26. For example, as described above, the TXV assembly 30 may be at an angle that is non-orthogonal relative to the firewall 26. When the TXV assembly 30 is loaded into the firewall 26, the first opening 112 supports the TXV assembly 30 in order to maintain the non-orthogonal angle.

The firewall facing side 118 faces the firewall 26 when the seal 100 is slid over the TXV housing 36. The second portion facing side 122 faces the second portion 108, and in particular, the first portion facing side 126. The second portion facing side 122 is adhered to the first portion facing side 126 by any means described above. In this manner, the first portion 104 and the second portion 108 form the seal 100.

The second opening 114 is configured to receive the TXV assembly 30 and have a tight fit with the TXV assembly 30. For example, the second opening 114 has a profile configured to match an outer profile of the TXV housing 36. In this manner, when the seal 100 is slid over the TXV housing 36, the second portion 108 is fit snug onto the TXV housing 36.

The first portion 104 has an outer profile similar to a profile of the aperture 52. More particularly, the first portion 104 has an outer profile configured to be received by the aperture 52 and form an interference fit between the seal 100 and the instrument panel 22. Accordingly, the outer profile of the first portion 104 may be slightly smaller than the aperture 52, and interferes with the dimensions of the aperture 52. In this manner, friction generated between the first portion 104 and the aperture 52 holds the seal 100, and thereby the TXV assembly 30, tightly in the firewall 26 without the need for additional fastening, gluing, or any other means of adhering the seal 100 to the firewall 26.

The second portion 108 has an outer profile similar to a profile of the flange 56. As described above, the flange 56 has a profile that is larger than the aperture 52, such that the flange 56 prevents the conduit 54 from passing through the aperture 52 when the TXV assembly 30 is loaded into the firewall 26. Similarly, the outer profile of the second portion 108 is larger than the aperture 52 and prevents the second portion 108 from passing through the aperture 52 when the TXV assembly 30 is loaded into the firewall 26. The flange facing side 130 faces the flange 56 when the seal 100 is slid over the TXV housing 36. The flange facing side 130 makes contact with the flange 56 when the TXV assembly 30 is loaded into the firewall 26. The flange facing side 130 is held against the flange 56 when the first portion 104 creates the interference fit with the firewall 26.

As illustrated in FIG. 5, and as described above, the TXV assembly 30 may be loaded non-orthogonally relative to a sealing surface of the firewall 26. For example, the conduit 54 and the aperture 52 may be orthogonal relative to each other, but non-orthogonal relative to the TXV assembly 30 when the TXV assembly 30 is loaded into the firewall 26. This may be due to the firewall 26 and the conduit 54 being designed to follow the contours of the vehicle 10, while the TXV assembly 30 is connected to the HVAC system in a manner that places the TXV assembly 30 at an angle that is greater than or less than 90° relative to the contours of the vehicle 10. It is understood that while the TXV assembly 30 is described as being at an angle non-orthogonal relative to the sealing surface of the firewall 26, the principles of the present disclosure apply when the TXV assembly 30 is at an angle that is orthogonal relative to the firewall 26.

When the first portion 104 is adhered to the second portion 108, an outer profile of the seal 100 is orthogonal relative to the conduit 54 and the aperture 52. In this manner, the first portion 104 is aligned with the aperture 52. When the TXV assembly 30 is loaded into the firewall 26, the first portion 104 is inserted into the aperture 52 and forms an interference fit with the firewall 26. The interference fit formed between the first portion 104 and the firewall 26 secures the seal 100 to the firewall 26.

When the first portion 104 is adhered to the second portion 108, the first opening 112 and the second opening 114 cooperate to form the core opening that is orthogonal relative to the TXV assembly 30. When the seal 100 is slid over the TXV housing 36, the TXV assembly 30 is held non-orthogonally relative to the outer profile of the seal 100. Similarly, when the first portion 104 is inserted into the aperture 52, the TXV assembly 30 passes through the aperture 52 and extends beyond the passenger compartment side 32 of the firewall 26 at a non-orthogonal angle relative to the firewall 26.

In the first embodiment, the pass-through seal 100 seals and aligns the TXV assembly 30 with the firewall 26. The pass-through seal of the present disclosure can be configured in various suitable ways to seal and align one or more components in a vehicle and should not be limited to the TXV assembly and firewall. As an example, in a second embodiment, a pass-through seal is used to seal and align components for a rear HVAC system that extend through a floorboard of the vehicle.

Figure 6:
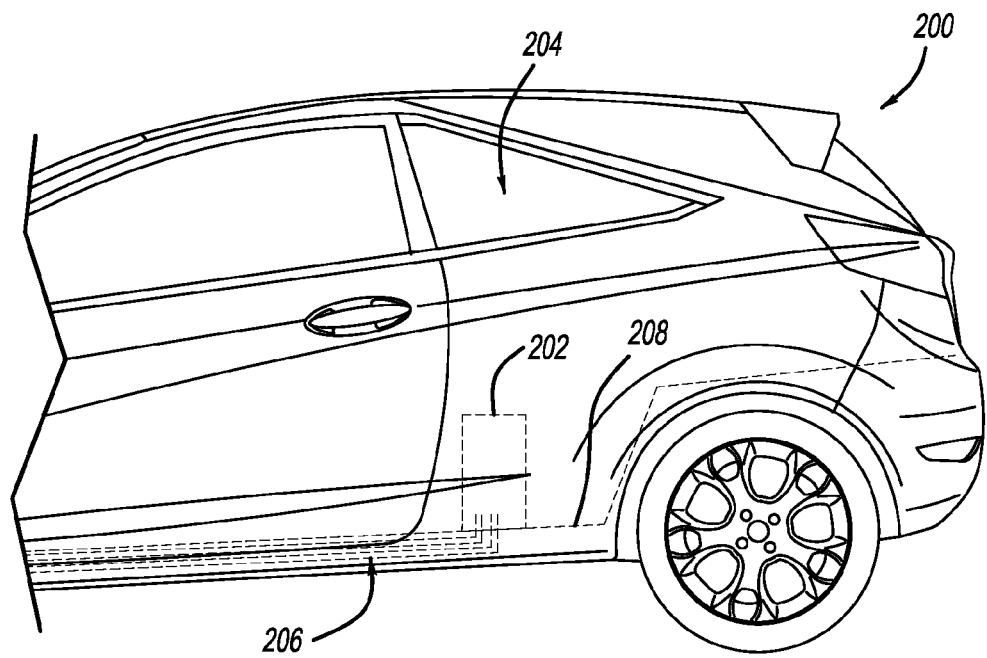
FIG. 6 is a side view of a vehicle according to a second example embodiment.

More particularly, with reference to FIG. 6, a vehicle 200 having a rear HVAC system 202 is illustrated. The rear HVAC system 202 conditions the air for a rear passenger compartment 204 of the vehicle 200. Fluid lines 206 extend externally along an outer surface of a floorboard 208 from a hood area (not shown) to the rear HVAC system 202. To connect to the rear HVAC system 202, the fluid lines 206 extend through the floorboard 208 and connect to the rear HVAC system 202.

Figure 7:
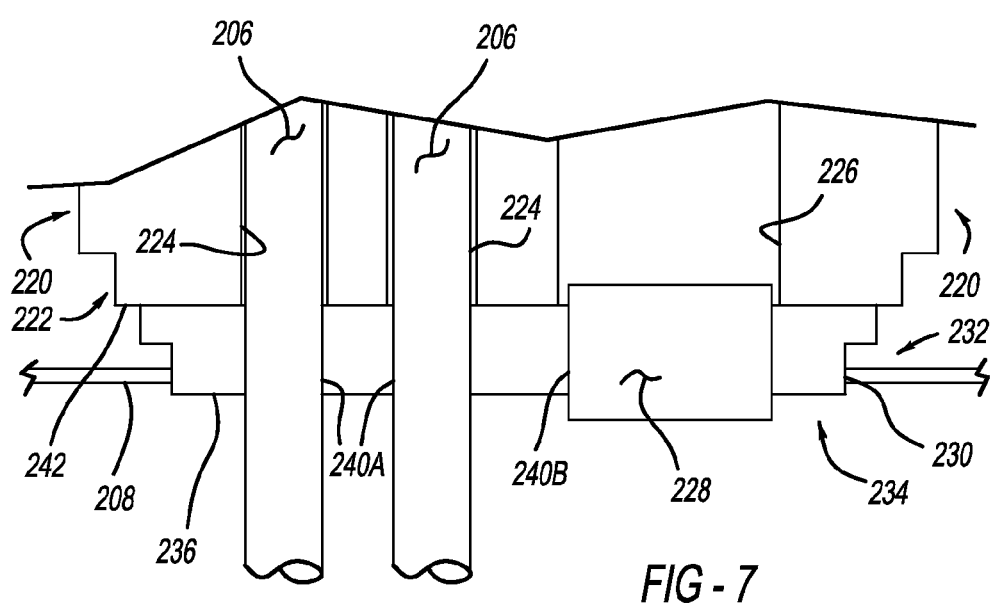
FIG. 7 is a partial cross-sectional view of a portion of a floorboard and a rear HVAC system with a pass-through seal of the present disclosure disposed between the floorboard and the rear HVAC system.

With reference to FIG. 7, the rear HVAC system 202 includes a case 220 that houses the components of the rear HVAC system 202 (e.g., condenser, evaporator, blower fan, etc.). The case 220 includes a bracket area 222 that defines one or more tube passages 224 for the fluid lines 206. The bracket area 222 also defines a TXV passage 226 that receives a TXV assembly 228. The fluid lines 206 and the TXV assembly 228 may be collectively referred to as components 206, 228 hereinafter.

The components 206, 228 extend through an aperture 230 defined by the floorboard 208 such that a portion of the components 206, 228 extend through a vehicle interior side 232 and a portion of the components extend through a vehicle exterior side 234. The bracket area 222 has a profile that is larger than the aperture 230 to prevent the bracket area 222 from passing through the aperture 230.

To prevent fluid and/or debris from flowing through the aperture 230, a pass-through seal 236 is used to seal the aperture 230. Specifically, based on the principles discussed with respect to the first embodiment, the pass-through seal 236 defines a core opening 240 for each of the components 206, 228. For example, each of the fluid line 206 passes through a core opening 240A and the TXV assembly 228 passes through a core opening 240B. The core openings 240A and 240B are collectively referred to as "core opening 240".

Furthermore, the pass-through seal includes two or more portions (not shown) that are fixedly coupled to each other to form the pass-through seal 236 having the core opening 240. Accordingly, each of the portions defines an opening for each of the components 206, 228. The openings of each of the portions may be different in order to properly align the components 206, 228. For example, a first portion of the pass-through seal 236 may be arranged to interface with the aperture 230 of the floorboard 208 and a second portion of the pass-through seal 236 may be arranged to interface with a surface of the bracket area 222. Similar to the first embodiment, the first portion may define openings that support the components 206, 228 at a predetermined angle with respect to the floorboard 208 and the second portion defines openings that may match the profile of respective components 206, 228 such that the openings snugly fit around the components 206, 228. Additional portions may be provided between the first portion and the second portion for guiding and supporting the components 206, 228.

The pass-through seal 236 further interfaces with the aperture 230 and the bracket 222. In particular, an outer profile of the pass-through seal 236 is varied such that one end of the pass-through seal 236 forms an interference fit with the floorboard 208 and the other end abuts with surface 242 of the bracket area 222 and prevents the pass-through seal from fully extending through the aperture 230. For example, the outer profile of the first portion of the pass-through seal 236 extends into the aperture 230 of the floorboard 208 and interferes with the aperture 230 such that friction generated between the pass-through seal 236 and the aperture 230 holds the pass-through seal 236. The second portion of the pass-through seal 236 abuts with the surface 242 of the bracket 222 and is slightly larger than the aperture 230 to prevent the second portion of the pass-through seal 236 from extending beyond the aperture 230.

Based on the foregoing, the pass-through seal of the present disclosure defines a core opening that forms an inner profile having a varying shape and size. The core opening aligns and supports a component, such as a TXV assembly, fluid lines, and/or other suitable component passing through an aperture defined by a member of a vehicle. In particular, the core opening is configured such that one end of the core opening holds the component at a predetermined angle with respect to a surface of the member and the other end forms a snug fit around the component. An outer profile of the pass-through seal may have a varying shape and/or size such that one end is similar in shape to the aperture and is sized to have an interference fit with the aperture, and the other end is larger than the aperture to prevent the pass-through seal from passing through the aperture. The pass-through seal of the present disclosure may be configured to align and seal the component with the member regardless of the angle at which it is assembled with the member. In other words, the pass-through seal may be used to align and seal one or more components that are assembled with a member at an orthogonal angle or non-orthogonal angle.

The foregoing description is merely illustrative in nature and is in no way intended to limit the disclosure, its application, or its uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, elements, and/or components, but do not preclude the presence or addition of one or more other features, elements, components, and/or groups thereof. As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A pass-through seal for sealing a component extending between a first member and a second member in a vehicle, the pass-through seal comprising:

two or more portions fixedly coupled and defining a core opening, wherein the core opening receives the component at a predefined angle relative to an aperture defined by the first member, wherein the two or more portions include:
- a first portion that has an outer profile configured to create an interference fit with the aperture defined by the first member, and the first portion defines a first opening that forms part of the core opening and supports the component at the predefined angle, and
- a second portion that has an outer profile larger than the aperture of the first member to prevent the second portion from passing through the aperture, and the second portion defines a second opening that forms part of the core opening and fits snuggly around the component;

wherein the core opening receives the component at an angle that is non-orthogonal to the aperture defined by the first member.

2. The pass-through seal of claim 1 wherein the second portion abuts against a surface and the second member.

3. The pass-through seal of claim 1 wherein:
the component includes at least two sub components that extend between the first member and the second member, and
the two or more portions define a core opening for each of the at least two subcomponents.

4. The pass-through seal of claim 1 wherein the two or more portions further include at least one more portions different from the first portion and the second portion, and the at least one more of the portions is arranged between the first portion and the second portion.

5. The pass-through seal of claim 1 wherein the first member is a floorboard of a vehicle.

6. A system for sealing a thermostatic expansion valve TXV assembly to a vehicle firewall, the system comprising:
a pass-through seal that:
  interfaces with a flange disposed at an end of an engine bay conduit that directs the TXV assembly toward the firewall;
  receives the TXV assembly at a predefined angle relative to an aperture defined by the firewall;
  includes an outer profile that is orthogonal relative to the firewall aperture;
  is configured to be inserted into the firewall aperture; and
  supports the TXV assembly at the predefined angle and frictionally seals the TXV assembly to the firewall when the pass-through seal is inserted into the firewall aperture;
  wherein the pass-through seal receives the TXV assembly at an angle that is non-orthogonal relative to the firewall.

7. The system of claim 6 wherein the pass-through seal further comprises a first portion comprising a first opening and a second portion comprising a second opening.

8. The system of claim 7 wherein the first portion includes an outer profile configured to create an interference fit with the firewall when the pass-through seal is inserted into the firewall aperture.

9. The system of claim 7 wherein the second portion includes an outer profile configured to prevent the second portion from passing through the firewall when the pass-through seal is inserted into the firewall aperture and wherein the second portion interfaces with the flange when the first portion is inserted into the firewall aperture.

10. The system of claim 7 wherein the second opening is configured to fit snug around the TXV and the first opening is configured to support the TXV at the predefined angle.

11. A system for sealing a thermostatic expansion valve TXV assembly to a vehicle firewall, the system comprising:
an engine bay conduit that directs the TXV assembly toward an engine bay side of the firewall, the conduit having a flange disposed at an end of the conduit that faces the engine bay side of the firewall;
a firewall aperture defined by the firewall; and
a pass-through seal that:
  receives the TXV assembly at a predefined angle relative to the firewall aperture;
  includes an outer profile that is non-orthogonal relative to the firewall aperture; and
  frictionally fastens the TXV assembly to the firewall when the pass-through seal is inserted into the firewall aperture;
  wherein the pass-through seal receives the TXV assembly at an angle that is non-orthogonal relative to the firewall.

12. The system of claim 11 wherein the pass-through seal further comprises a first portion and a second portion.

13. The system of claim 12 wherein the first portion includes an outer profile configured to create an interference fit with the firewall when the pass-through seal is inserted into the firewall aperture.

14. The system of claim 12 wherein the second portion includes an outer profile configured to prevent the second portion from passing through the firewall when the pass-through seal is inserted into the firewall aperture.

15. The system of claim 12 wherein the first portion includes a first opening and the second portion includes a second opening.

16. The system of claim 15 wherein the second opening is configured to fit snug around the TXV and the first opening is configured to support the TXV at the predefined angle.

* * * * *